Feb. 7, 1939.  C. G. KRONMILLER  2,146,680
LIQUID CONTROL
Filed Feb. 18, 1935  4 Sheets-Sheet 1

INVENTOR
Carl G. Kronmiller
BY HIS ATTORNEY
George H Fisher

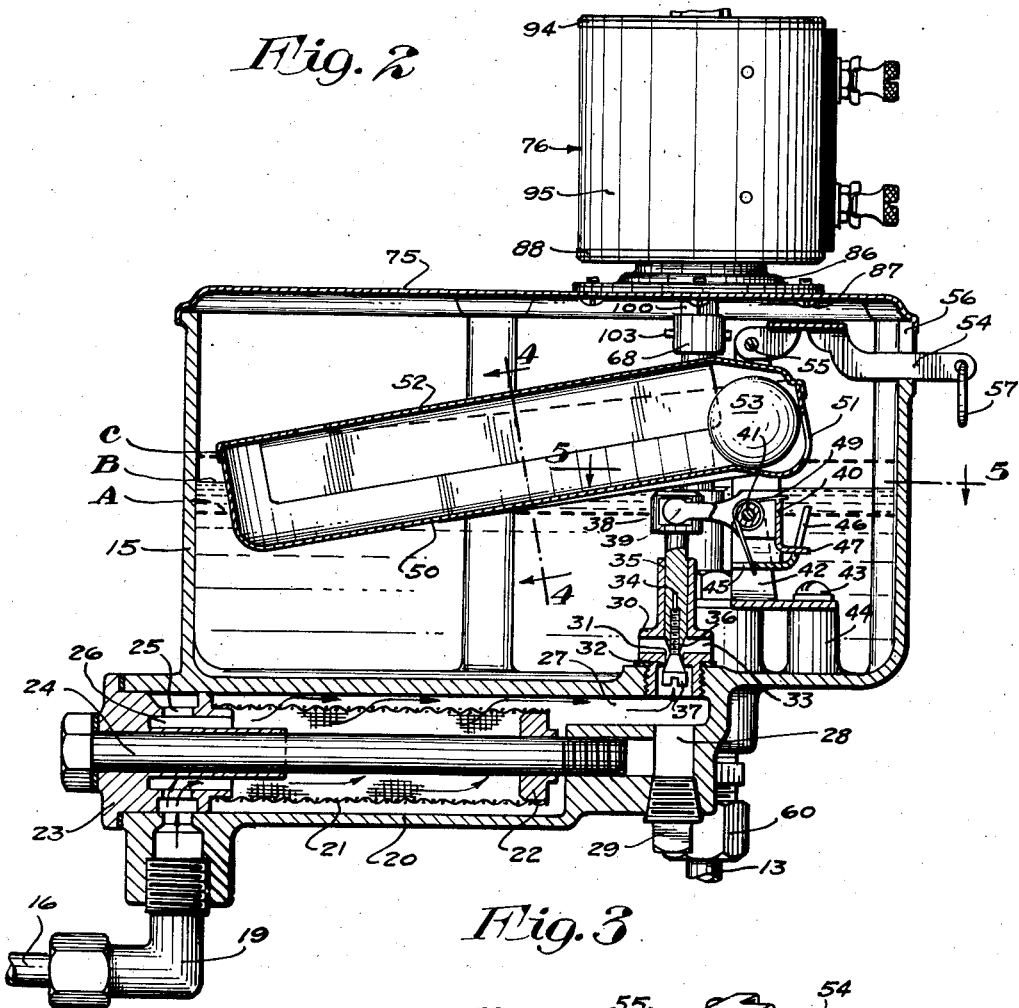

Feb. 7, 1939. C. G. KRONMILLER 2,146,680
LIQUID CONTROL
Filed Feb. 18, 1935 4 Sheets-Sheet 3
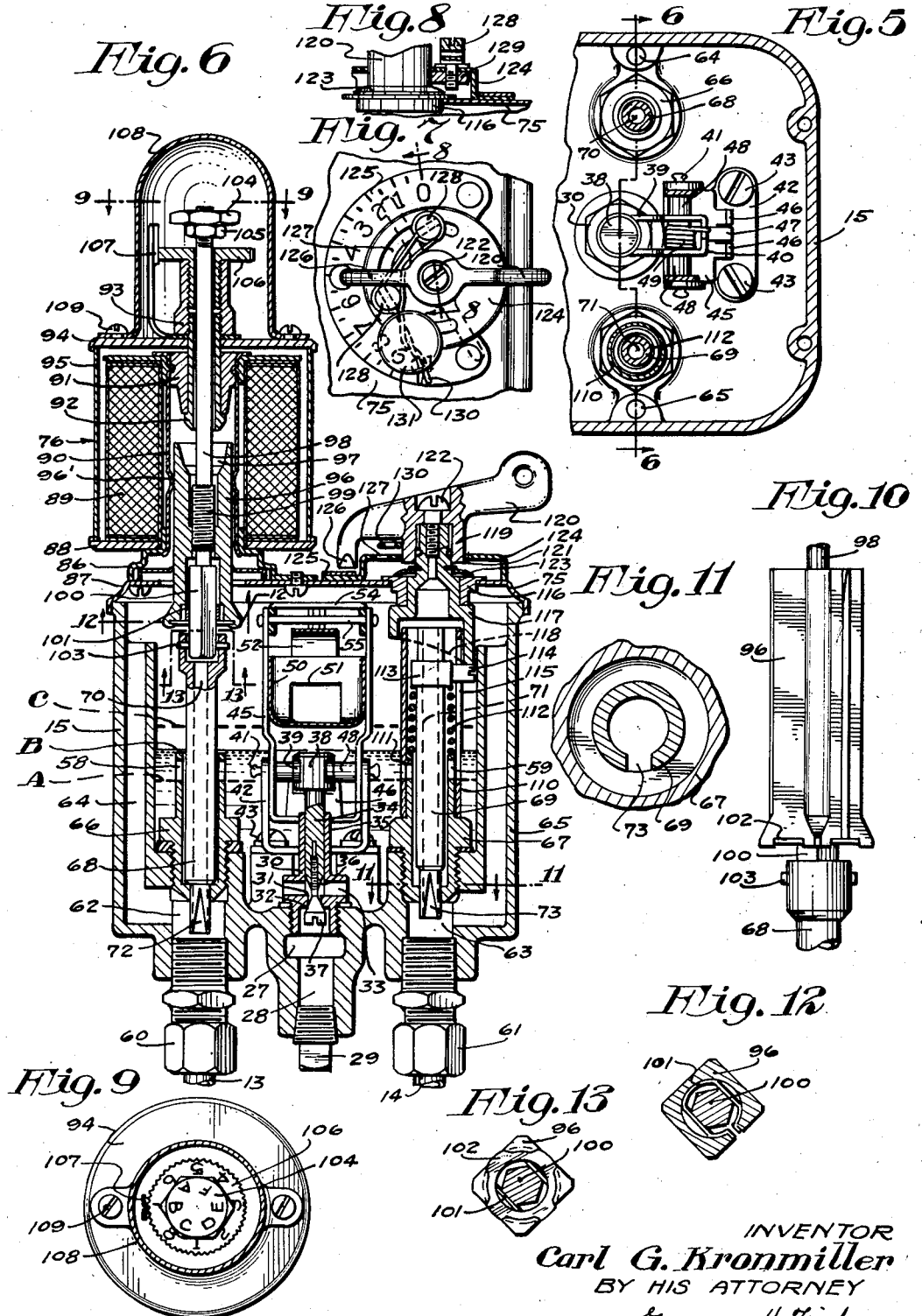
INVENTOR
Carl G. Kronmiller
BY HIS ATTORNEY
George H. Fisher Feb. 7, 1939. C. G. KRONMILLER 2,146,680
LIQUID CONTROL
Filed Feb. 18, 1935 4 Sheets-Sheet 4

INVENTOR
Carl G. Kronmiller
BY HIS ATTORNEY
George H. Fisher

Patented Feb. 7, 1939

2,146,680

UNITED STATES PATENT OFFICE 2,146,680

LIQUID CONTROL

Carl G. Kronmiller, Minneapolis, Minn., assignor to Minneapolis-Honeywell Regulator Company, Minneapolis, Minn., a corporation of Delaware Application February 18, 1935, Serial No. 7,017

5 Claims. (Cl. 137—68)

This invention relates to liquid controllers in general and is of particular utility when used in connection with gravity feed systems for oil burners.

An object of this invention is to provide a valve mechanism which is responsive to variations in liquid level in a casing to regulate the supply of liquid to said casing and to absolutely close off the supply of liquid to the casing when the liquid level therein becomes abnormal.

A further object is to provide a valve structure comprising a valve member having a pair of valve portions adapted to seat against a pair of valve seats to control the supply of fluid to a casing, a float member responsive to normal variations of liquid level in the casing for moving one of the valve portions with respect to one of the valve seats to regulate the level of the liquid in the casing and to move the other valve portion against the other valve seat upon the existence of an abnormal liquid level in the casing to prevent the admission of liquid into the casing.

A further object is to provide a valve mechanism for normally controlling the level of liquid in a casing and for positively shutting off the supply of liquid to the casing when the liquid level therein becomes abnormal and a manual reset means for setting the device in condition for further normal operation after the valve mechanism has been closed by the existence of the abnormal liquid level in the casing.

Another object is to provide a valve mechanism for controlling the level of a liquid in a casing, the valve being controlled by a pan float which normally rides on the surface of the liquid to regulate the level of the liquid in the casing and which sinks in the liquid when the liquid level in the casing becomes abnormal to close off the valve mechanism to prevent further liquid from entering the casing and a ball weight mechanism for assisting the pan float in closing off the valve mechanism.

Other objects and advantages may become apparent to those skilled in the art by reference to accompanying specification, claims and drawings in which:

Fig. 2 is a vertical sectional view through one form of my control device;

Fig. 3 is a perspective view of the float assembly used in Fig. 2;

Fig. 4 is a section through the pan float taken on the line 4—4 of Fig. 2 but showing the ball weight in a down position;

Fig. 5 is a horizontal sectional view taken substantially on the line 5—5 of Fig. 2;

Fig. 6 is a vertical sectional view through the control device taken substantially on the line 6—6 of Fig. 5;

Fig. 7 is a partial plan view of the manual adjusting means shown in Fig. 6;

Fig. 8 is a sectional view taken substantially on the line 8—8 of Fig. 7;

Fig. 9 is a horizontal sectional view taken substantially on the line 9—9 of Fig. 6;

Fig. 10 is an enlarged elevational view of the core or plunger shown in Fig. 6 showing the manner of attaching the valve stem thereto;

Fig. 11 is a horizontal sectional view taken on the line 11—11 of Fig. 6;

Fig. 12 is a horizontal sectional view taken on the line 12—12 of Fig. 6;

Fig. 13 is a horizontal sectional view taken on the line 13—13 of Fig. 6;

Figure 1:
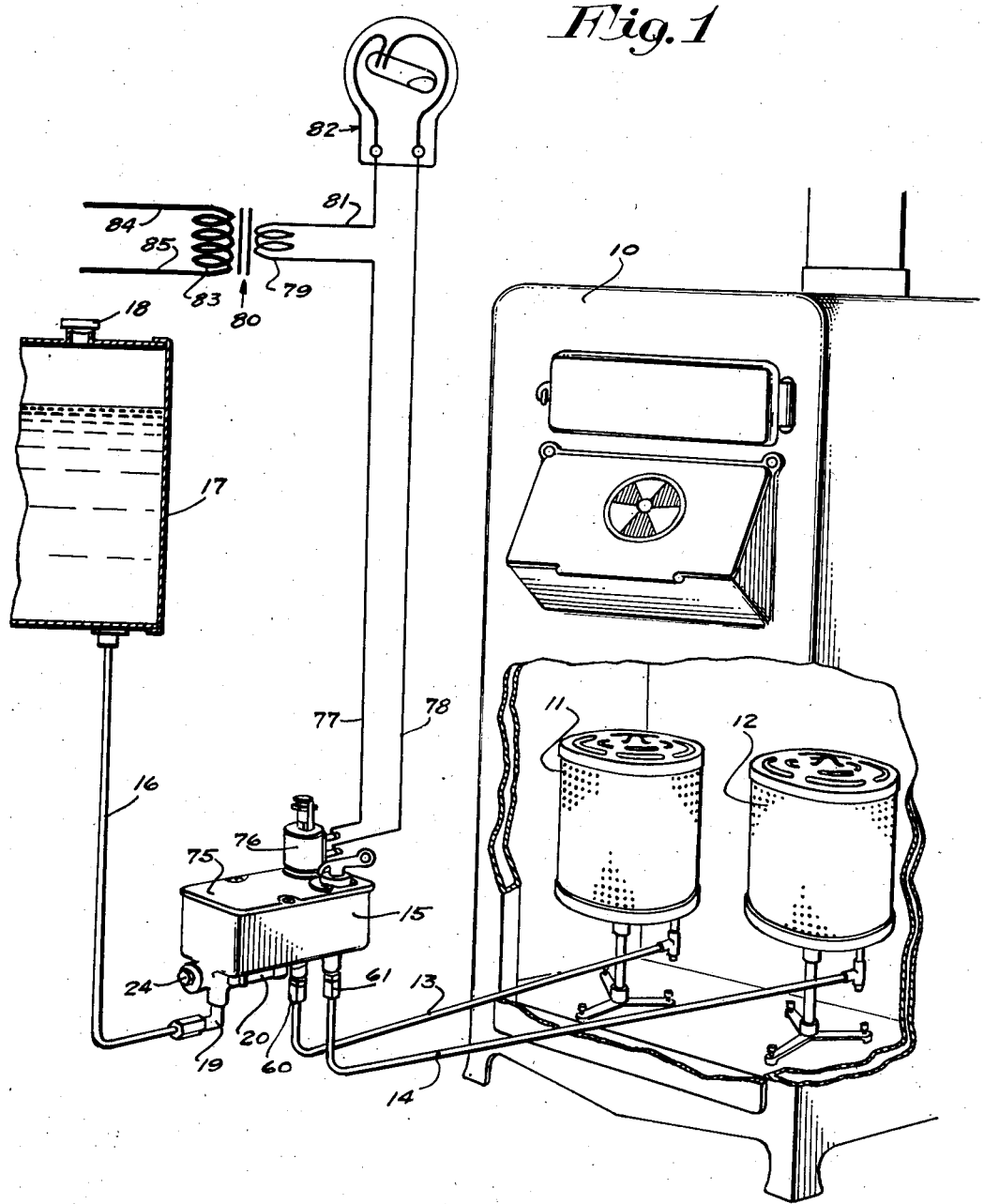
Fig. 1 is a diagrammatic view showing my control device as applied to an oil burner system.

Referring now to Fig. 1, one form of the control device of my invention is shown as applied to a heating system comprising a boiler 10 which is heated by means of oil burners 11 and 12. Fuel oil is fed to the oil burners 11 and 12 by means of feed lines 13 and 14 leading from a controller box or housing 15. Fuel oil is supplied to the controller box or housing 15 by means of a supply line 16 leading from a reservoir 17 provided with the usual filler opening 18. The reservoir 17 should be located above the control box 15 so that fuel oil may be delivered thereto by gravity and the control box 15 should be located at about the same level as the oil burners 11 and 12 so that the proper liquid level may be maintained in the burners 11 and 12.

Referring now to Fig. 2, the supply line 16 is secured to a cylindrical bottom portion 20 of the housing 16 by means of a fitting 19. Located within the cylindrical bottom portion 20 is a cylindrical screen 21 which is held in place by means of supporting members 22 and 23. The supporting members are located on and held in place by means of a bolt 24 extending longitudinally in the cylindrical bottom portion 20. The supporting member 23 is provided with radial openings 25 opening into an annular passage 26 whereby fuel oil is delivered from the supply line 16 to the inside of the screen 21. A longitudinal passage 27 connects the cylindrical bottom portion 20 with a vertically extending passage 28. The bottom end of the vertically extending passage 28 is closed by means of a screw plug 29. Screwed into the upper extremity of the vertically extending passage 28 is a valve seat member 30 having upper and lower valve seats 31 and 32, respectively. Radial passages 33 extend from the valve seats 31 and 32 and open into the housing 15. By reason of this construction, fuel oil is delivered from the supply line 16 through the screen 21 past the upper and lower valve seats 31 and 32 and through the radial openings 33 into the housing 15. Slidably mounted in an extension 35 of the valve seat member 30 and guided thereby is a valve member 34 having an upper valve portion 36 and a lower valve portion 37 adapted to engage at certain times with the upper and lower valve seats 31 and 32, respectively, to control the flow of fuel oil past these valve seats.

The upper end of the valve member 34 is provided with a head 38 having indentations therein which receive fingers 39 of a U-shaped actuating member 40. The U-shaped actuating member 40 is pivoted by means of a pivot pin 41 to a support 42 which is held in place by means of screws 43 extending into bosses 44 in the housing 15.

Mounted on the pivot pin 41 is also a vertically extending U-shaped member 45 having spaced upstanding lugs 46. The U-shaped actuating member 40 has a laterally extending lug 47 adapted to engage between the upstanding space lugs 46 of the U-shaped member 45. The U-shaped members 40 and 45 are held in spaced relation on the pivot pin 41 by means of spacers 48, as shown in Fig. 5. The laterally extending lug 47 of the U-shaped member 40 is held in engagement with the lower portion of the U-shaped member 45 by means of a spring 49. By reason of this spring 49 a strain release connection is afforded between the U-shaped members 40 and 45 so that when the valve portion 37 engages the seat 32, further upward movement of the pan float 50 is permitted.

Rigidly secured to the upstanding legs of the U-shaped member 45 is a pan float member 50 which is open at its upper side. The end of the pan adjacent the member 45 is provided with an opening 51. Secured to the pan float member 50 is a guide 52 along which a ball weight 53 may roll.

When the liquid level in the housing 15 lowers below a predetermined value the pan 50 lowers a corresponding amount to cause counter-clockwise movement of the U-shaped member 40 causing downward movement of the valve member 34 and consequent movement of the valve portion 37 away from its seat 32 to permit fuel oil to enter into the housing 15 through the radial passages 33. As the liquid level in the housing 15 rises the pan and the U-shaped member 45 are moved in a clockwise direction which compresses the spring 49 causing the U-shaped member 40 also to move in a clockwise direction causing upward movement of the valve member 34 and consequent movement of the valve portion 37 toward its seat 32. From this it is seen that the valve portion 37 is moved toward or away from its seat 32 according to variations in the height of liquid level in the housing 15 to control the supply of fuel oil thereto.

A lever 54 is pivoted to the upstanding legs of the U-shaped actuating member 45. This lever 54 extends out through a slot 56 in the housing 15 and is provided with a ring 57 for manual operation. By moving the lever 54 inwardly or outwardly the pan float 50 and consequently the valve 34 may be manually positioned.

The feed lines 13 and 14 extending to the burners 11 and 12 are connected into vertical passages 62 and 63, (Fig. 6), formed in the housing 15 by means of fittings 60 and 61, respectively. The vertical passages 62 and 63 are provided with upwardly extending pressure relief passages 64 and 65 which open into the housing 15 above the level of the liquid contained therein to prevent the formation of air pockets in the feed lines 13 and 14. Mounted in the upper extremities of the vertical passages 62 and 63 are valve seat members 66 and 67, and these valve seat members are provided adjacent their upper extremities with radially extending openings 58 and 59. Extending longitudinally in the valve seat members 66 and 67 are metering valves 68 and 69 having longitudinal passages 70 and 71 therein. The lower ends of the metering valves 68 and 69 are provided with extensions which have a sliding fit in the valve seat members 66 and 67, respectively, to seal the same effectively. These extensions are provided with metering orifices 72 and 73 whereby the amount of fluid delivered from the housing 15 between the valve seat members 66 and 67 and the metering valves 68 and 69 may be accurately metered. The passages 70 and 71 open at their upper ends into the casing 15 above the level of the liquid therein to prevent the formation of air pockets in the metering valve extensions.

The top of the housing 15 is closed by means of a cover plate 75. Mounted on the cover plate 75 is a solenoid assembly generally designated 76. By referring again to Fig. 1, wires 77 and 78 lead from this solenoid assembly 76, the wire 77 being connected to a secondary 79 of a step-down transformer 80, and the wire 78 being connected to a condition responsive device such as a room thermostat 82. The room thermostat 82 is also connected by means of a wire 81 to the secondary 79 of the step-down transformer 80. The transformer 80 is provided with a primary 83 which is connected to line wires 84 and 85.

When the temperature of the space to be heated falls below a predetermined value, the room thermostat 82 moves to circuit closing position thereby closing a circuit from the secondary 79 of the step-down transformer 80 through wire 81, thermostat 82, wire 78, solenoid 76, and wire 77 back to the secondary 79 of the transformer 80 to energize the solenoid 76 to cause opening of the metering valve 68.

Referring now to Fig. 6, solenoid assembly 76 is mounted on a support 86 which is secured to the cover plate 75 by means of screws 87. Located on the support 86 is a bottom plate 88, and a coil assembly 89 is held fixed to the bottom plate 88 by means of a non-magnetic conducting tube 90. The upper end of the non-magnetic conducting tube 90 is closed by means of a non-magnetic conducting plug 91. Extending through this non-magnetic conducting plug 91 is a magnetic stop member 92 which is secured at its upper end in an abutment member 93. Surrounding the coil assembly and resting on the bottom plate 88 is a casing 95, and a top plate 94 rests on this casing 95. By reason of the connection between the non-magnetic conducting plug 91 and the abutment member 93 by the magnetic stop member 92, the parts above enumerated are held in fixed relation.

Loosely mounted in the non-magnetic conducting tube 90 is a magnetic core preferably made of soft iron. Relative rotation between the core 96 and the non-magnetic conducting tube 90 is prevented by the indentations 96' engaging the flattened surfaces on the core 96. The core 96 is provided with tapered bores 97 to coact with the non-magnetic conducting plug 91 and the magnetic stop 92 to prevent vibration and noise in the manner pointed out in application Serial No. 740,547, filed August 20, 1934, by Willis H. Gille.

A rod 98 is mounted for reciprocation in the magnetic stop 92 and the abutment 93 and is screw-threaded to the core 96 as at 99. The lower end of the rod 98 is provided with a hexagonal portion 100 which is engaged by a spring 101 mounted in the core 96 in the manner shown in Fig. 12. The spring 101 is held in place by means of an annular disc 102 as shown in Fig. 13. By means of the hexagonal portion 100 and the spring 101, relative rotation of the rod 98 with the core 96 is resisted so that when the rod 98 has been moved to a definite position with respect to the core 96 these two parts cannot get out of adjustment. The hexagonal portion 100 of the rod 98 is secured to the upper end of the metering valve 68 by means of a pin 103.

Screw-threaded on the upper extremity of the rod 98 is a hexagonal nut 104 which is locked in place by means of a lock nut 105. The hexagonal nut 104 is provided with indications, as shown in Fig. 9, to show the relative position of the rod 98 with respect to the core 96. By turning the nut 104 the rod 98 is turned to move the core 96 longitudinally with respect to the rod 98 to adjust the open position of the metering valve 68. Screw-threaded in the abutment member 93 is a combined stop and dial member 106. By raising and lowering the stop and dial member 106 with respect to the abutment member 93 the downward movement of the rod 98, and consequently the downward closing movement of the valve 68, is limited by the lock nut 105 engaging the stop and dial member 106. In this manner the metering valve 68 may be held in a partially open position when the solenoid 76 is deenergized for minimum flame operation of the oil burners. A pointer 107 secured to the top plate 94 coacts with the stop and dial member 106 and with the graduated nut 104 to determine the positions of these members to show the amount of valve opening when the valve is moved to an open position or toward a closed position. These dial members and associated structure recited immediately above are enclosed by means of a cover 108 which is held in place on the top plate 94 by means of screws 109.

When the parts are properly adjusted in the manner pointed out above, the core 96 will be moved upwardly against the magnetic stop member 92 upon energization of the coil windings 89 to move the valve to open position, the amount of opening movement of the valve being determined by the relative positions of the core 96 and the rod 98. Upon deenergization of the coil windings 89 the core and the valve are moved downwardly by gravity toward a valve closing position. The downward movement of the valve toward closing position is stopped by means of the lock nut 105 engaging the stop 106 whereby the metering valve 68 remains in a partially open position to permit a restricted flow of fuel oil from the housing 15 through the feed line 13 to the oil burner 11.

Located on the valve seat member 67 of the other metering valve is a sleeve 110 provided with an inturned lug 111 which engages in one of the radial slots 59 located in the valve seat member 67. By reason of this inturned lug, rotation of the sleeve 110 is prevented. Located between the valve seat member 67 and a collar 113 rigidly secured to the metering valve 69 and inside of the sleeve 110 is a spring 112 tending at all times to urge the metering valve 69 towards an open position. The collar 113 is rigidly secured on the metering valve 69 by means of a screw 114 which extends outwardly through a slot 115 in the sleeve 110.

Rigidly secured to the cover plate 75 is a bearing guide 116 in which is mounted for rotation a cam member 117 having a cam surface 118 at the lower extremity thereof to be engaged by the screw 114. The cam member 117 is provided with an upper splined extension 119 upon which is mounted a handle 120. An abutment ring 121 is held in place on the cam member 117 by the handle 120, and the handle 120 is locked in place on the splined extension 119 by means of the screw 122. Abutting against the abutment ring 121 is a friction disc 123 which engages the upper surface of the bearing guide 116. By reason of this friction disc 123 the handle 120 is held against accidental movement. By turning the handle 120 the cam member 117 is likewise turned and the cam surface 118 thereof causes longitudinal movement of the metering valve 69 to move the valve to open and closed positions.

Mounted on the cover plate 75 is a cup-shaped member 124 which encloses the friction disc 123. A dial 125 is secured to the cup-shaped member 124, and this dial 125 coacts with a pointer 126 located on the handle 120 to show the position of the valve 69. The cup-shaped member 124 is provided with an arcuate slot 127 in which are mounted adjustable stops 128. The adjustable stops 128 are held in position along the arcuate slot 127 by means of nuts 129. By reason of this construction the adjustable stops 128 may be positioned along the arcuate slot 127 to adjustably limit the movement of the handle 120. The adjustable stops 128 are provided with openings therein adapted to receive a wire 130 which is sealed by means of a seal 131. By reason of this construction the adjustable stops 128 may be positioned along the arcuate slot 127 to limit the opening and closing movement of the valve 69 and may be locked and sealed in place to prevent haphazard tampering with the same.

Although I have shown and described a solenoid means for operating one of the valves in response to changes in room temperature and a manual means for operating the other valve, it is within the contemplation of this invention that both valves may be operated by solenoids in response to changes in condition or that both valves may be manually operated. The showing made above is for purposes of illustration and not of limitation.

Referring now to Fig. 2, the liquid level contained therein is designated at B. This is the normal level to be contained within the housing 15, and with the parts in this position the valve portion 37 is held against its seat 32 to prevent the flow of fuel oil from the supply line 16 into the housing 15. When the liquid level lowers below this level B the pan 50 floating on the liquid also lowers to move the valve 37 away from its seat 32 to permit the flow of fuel oil into the housing 15. The liquid level designated A shows the minimum level that may be present and still permit flow of liquid through the metering valves 68 and 69. This low level designated A is determined by the bottom of the slots 58 and 59 of the valve seat members 66 and 67 as viewed in Fig. 6.

Figure 15:
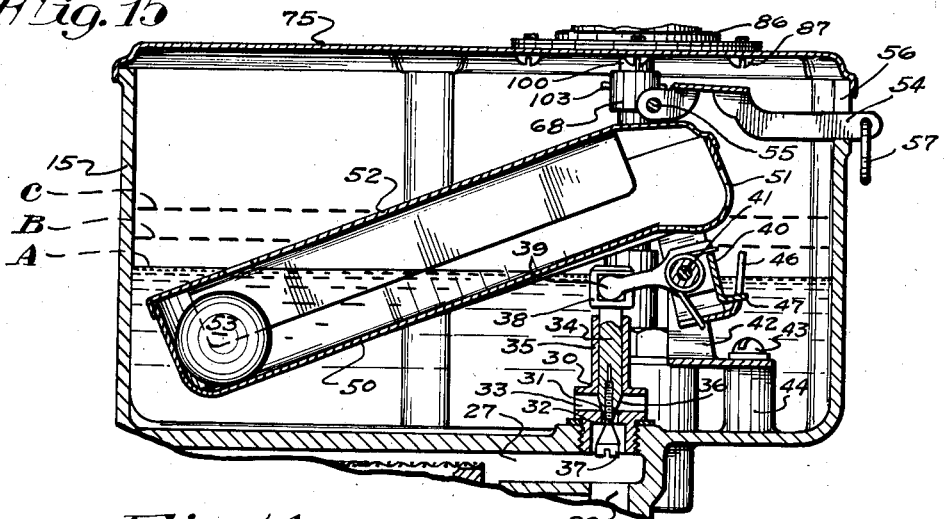
Figs. 14 and 15 are vertical sectional views similar to that of Fig. 2 but showing the parts in different positions of operation.
Figure 14:
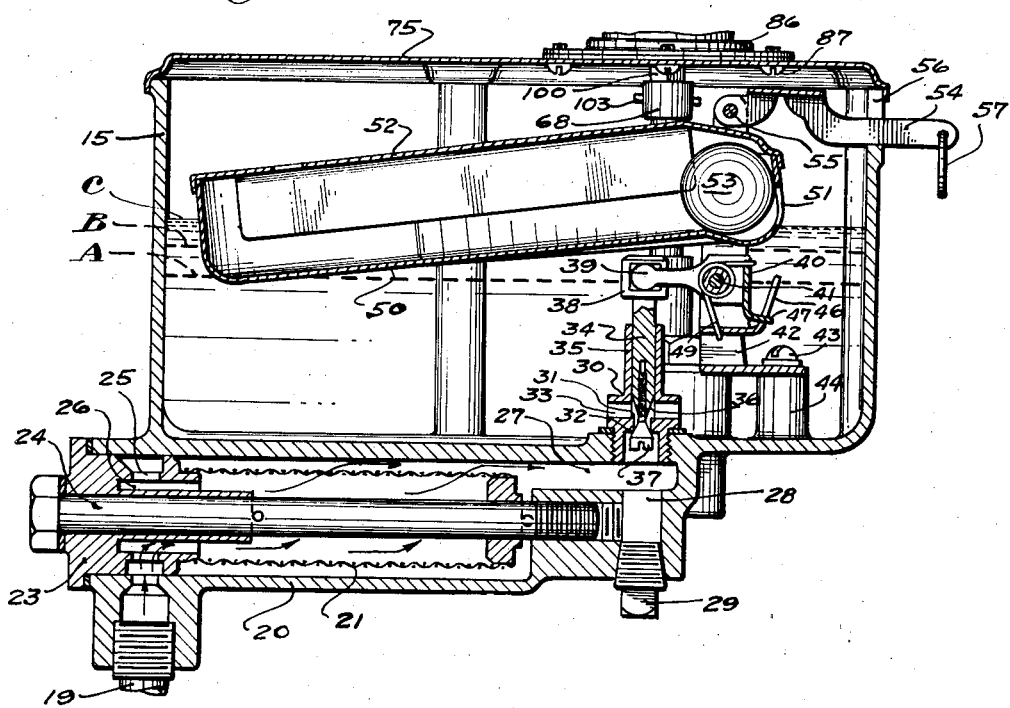

Should the level of the liquid rise above the level B to the level shown at C in Fig. 14, the liquid will then enter the pan 50 through the slot 51. When sufficient liquid has entered this pan 50 through slot 51 the pan will sink to such a position that ball weight 53 will roll from the position shown in Fig. 2 to the position shown in Fig. 15 causing extreme counter-clockwise movement of the U-shaped actuating member 45 and consequently counter-clockwise movement of the U-shaped member 40. This abnormal movement of the member 40 causes an abnormal downward movement of the valve member 34 to cause the valve portion 36 thereof to engage forcibly the upper valve seat 31 to prevent further flow of liquid into the housing 15. By reason of the ball weight 53 moving downwardly along the pan 50, as shown in Fig. 15, an increasing lever arm is brought about to position the valve portion 36 forcibly against its associated seat 31.

When the liquid level has receded to a value less than C, say B or A (Fig. 15), the valve portion 36 may be moved away from the seat 31 by manual manipulation of the lever 54. By pulling on the ring 57 the pan 50 is raised above the position shown in Fig. 2, and the fuel oil contained in the pan 50 is allowed to drain out therefrom through the opening 51. When the pan 50 has been emptied in this manner, the lever 54 may be released and the pan will again rest upon the liquid contained in the housing 15, and automatic operation may again be resumed in the manner pointed out above.

From the above it is seen that I have provided a structure for a control device wherein a valve is moved between open and closed positions, and vice versa, according to normal fluctuations in a liquid level and that the valve is forcibly moved to a closed position by means of an increasing lever arm arrangement to prevent the flow of liquid into the housing when an abnormally high liquid level occurs within the housing. Further, I have provided a metering valve structure for feeding liquid from the housing to a place of use either automatically or manually and wherein the amount of valve opening may be accurately adjusted.

Various modifications may be made embodying my invention without departing from the spirit and scope thereof, and I desire, therefore, that only such limitations be placed thereon as are imposed by the prior art or as set forth in the appended claims.

I claim as my invention:

1. In a control device of the class described, a casing adapted to contain a variable amount of liquid therein, valve means controlling the supply of liquid thereto comprising, a valve seat member having a pair of valve seats and a valve member having a pair of valve portions cooperating with said seats, a float member having an opening therein and adapted to ride on the liquid in said casing responsive to normal variations in liquid level for moving one of said valve portions with respect to one of said seats for regulating the level of the liquid therein and adapted to sink in said liquid by flow through said opening in response to an abnormal liquid level to move the other valve portion against the other seat to prevent liquid from entering said casing and a ball weight movable in said float member when said float member sinks in the liquid to move forcibly said other valve portion against said other seat.

2. In a control device of the class described, a casing adapted to contain a variable amount of liquid therein, valve means controlling the supply of liquid thereto, a pivotally mounted float member having an opening therein and adapted to ride on the liquid in said casing and operatively connected to said valve means, said float member being responsive to normal variations in liquid level for actuating said valve means to regulate the level of the liquid in the casing and adapted to sink in said liquid by flow through said opening in response to an abnormal liquid level to close said valve means to prevent liquid from entering said casing, means extending exteriorly of the casing for tilting said float member to empty liquid therefrom to condition the float member for normal operation, and strain release means in the connections between the float member and the valve means for permitting tilting of the float member.

3. In a control device of the class described, a casing adapted to contain a variable amount of liquid therein, valve means controlling the supply of liquid thereto comprising, a valve seat member having a pair of valve seats and a valve member having a pair of valve portions cooperating with said seats, a pivotally mounted float member having an opening therein and adapted to ride on the liquid in said casing and operatively connected to said valve member, said float member being responsive to normal variations in liquid level for moving one of the valve portions with respect to one of the valve seats for regulating the level of the liquid in the casing and adapted to sink in the liquid by flow through said opening in response to an abnormal liquid level to move the other valve portion against the other seat to prevent liquid from entering the casing, means for tilting said float member to empty liquid therefrom to condition the float member for normal operation, and strain release means in the connections between the float member and the valve member for permitting tilting of the float member.

4. In a control device of the class described, a casing adapted to contain a variable amount of liquid therein, valve means controlling the supply of liquid thereto, a pivotally mounted float member having an opening therein and adapted to ride on the liquid in the casing and operatively connected to said valve means, said float member being responsive to normal variations in liquid level for actuating said valve means to regulate the level of the liquid in the casing and adapted to sink in said liquid by flow through said opening in response to an abnormal liquid level to close said valve means to prevent liquid from entering said casing, a ball weight in said float member movable from an ineffective position to an effective position when the float member sinks in the liquid to increase the closing force applied to the valve means, means for tilting the float member to empty the liquid therefrom and to move the ball weight from the effective position to the ineffective position whereby the float member is conditioned for normal operation, and strain release means in the connections between the float member and the valve means for permitting tilting of the float member.

5. In a controlling device of the class described, a casing adapted to contain a variable amount of liquid therein, valve means controlling the supply of liquid thereto comprising, a valve seat member having a pair of valve seats and a valve member having a pair of valve portions cooperating with said seats, a pivotally mounted float member having an opening therein and adapted to ride on the liquid in said casing and operatively connected to said valve member, said float member being responsive to normal variations in liquid level for moving one of the valve portions with respect to one of the valve seats for regulating the level of the liquid in the casing and adapted to sink in the liquid by flow through said opening in response to an abnormal liquid level to move the other valve portion against the other valve seat to prevent liquid from entering the casing, a ball weight in said float member movable from an ineffective position to an effective position when the float member sinks in the liquid to move forceably said other valve portion against said other seat, means for tilting said float member to empty liquid therefrom and to move the ball weight from the effective position to the ineffective position whereby the float member is conditioned for normal operation, and strain release means in the connections between the float member and the valve member for permitting tilting of the float member.

CARL G. KRONMILLER.